United States Patent [19]

Speiser

[11] 4,060,850
[45] Nov. 29, 1977

[54] BEAM FORMER USING BESSEL SEQUENCES

[75] Inventor: Jeffrey M. Speiser, San Diego, Calif.

[73] Assignee: The United States of America as represented by the Secretary of the Navy, Washington, D.C.

[21] Appl. No.: 791,132

[22] Filed: Apr. 25, 1977

[51] Int. Cl.² ................. G06G 7/19; G06F 15/34
[52] U.S. Cl. ................. 364/819; 324/77 G; 364/726; 364/728; 364/821; 364/827; 364/851
[58] Field of Search .......... 235/181, 193, 197, 150.5, 235/150.53, 156, 152; 324/77 B, 77 D, 77 G, 77 H; 310/8.1; 333/72, 30 R; 73/67.5 R, 67.7, 67.6, 67.8 R, 67.8 S, 67.9

[56] References Cited

U.S. PATENT DOCUMENTS

| | | | |
|---|---|---|---|
| 3,770,949 | 11/1973 | Whitehouse et al. | 235/181 |
| 3,809,876 | 5/1974 | Byram | 235/197 |
| 3,900,721 | 8/1975 | Speiser et al. | 235/156 |
| 3,903,406 | 9/1975 | London | 235/181 |
| 3,926,367 | 12/1975 | Bond et al. | 235/181 |
| 3,965,343 | 6/1976 | Speiser et al. | 235/156 |
| 4,010,360 | 3/1977 | Alsup et al. | 235/156 X |

*Primary Examiner*—Joseph F. Ruggiero

*Attorney, Agent, or Firm*—Richard S. Sciascia; Ervin F. Johnston; John Stan

[57] ABSTRACT

A beam former, to be used with a circular array of N receiving elements, $N \geq 3$, comprising a set of N discrete Fourier transform (DFT) devices, each one connected to one of the receiving elements, for taking a temporal discrete Fourier transform of the signals at each of the N receiving elements. Means are connected to the array of DFT devices, for connecting sequentially to each of the N devices. A reference function generator generates the sequence of terms $$G_n = \sum_{p=-M}^{M} J_{n+pN}(x), \quad n = 0, 1, \ldots, N-1, \quad (1)$$

where the argument $x$ is equal to the number of wavelengths in the circumference of the circular array at the frequency being processed, and M is several times greater than $x$. A means connected to the connecting means and to the reference function generator circularly convolves the signals, for example, acoustic signals, received from the connecting means and the function generator. The beam former may further comprise means connected to the convolving means for displaying the inverse discrete Fourier transform, and therefore the beam pattern.

12 Claims, 11 Drawing Figures

BESSEL SEQUENCE BEAMFORMER (PRIOR ART) DIRECT CHIRP-Z TRANSFORM IMPLEMENTATION.

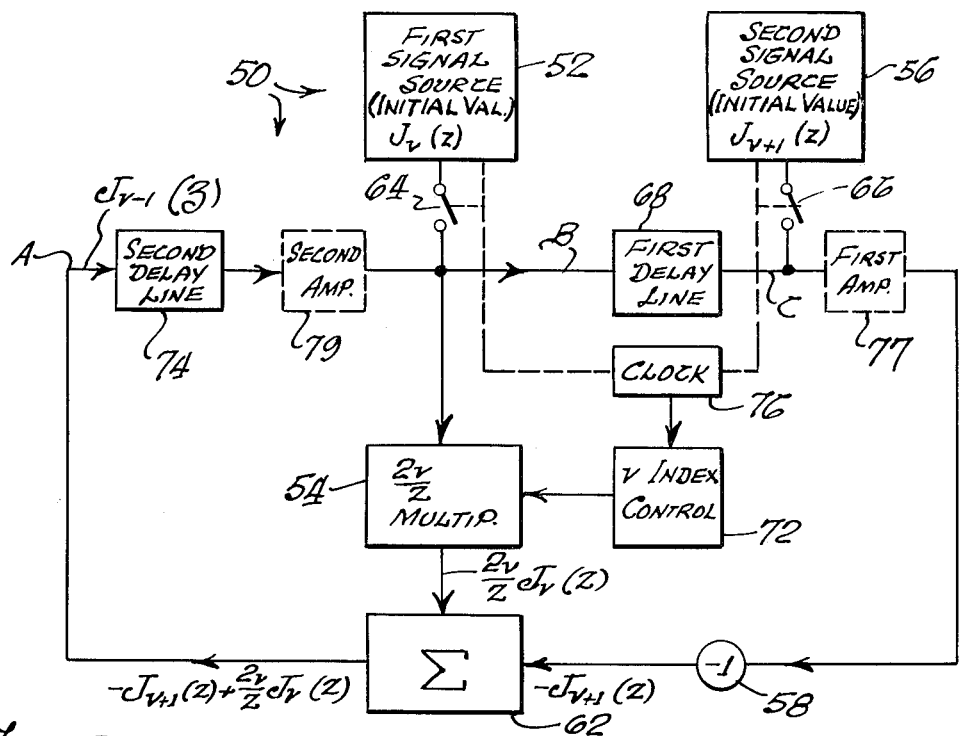
FIG. 3. (PRIOR ART) BESSEL FUNCTION GENERATOR USING DELAY LINES.
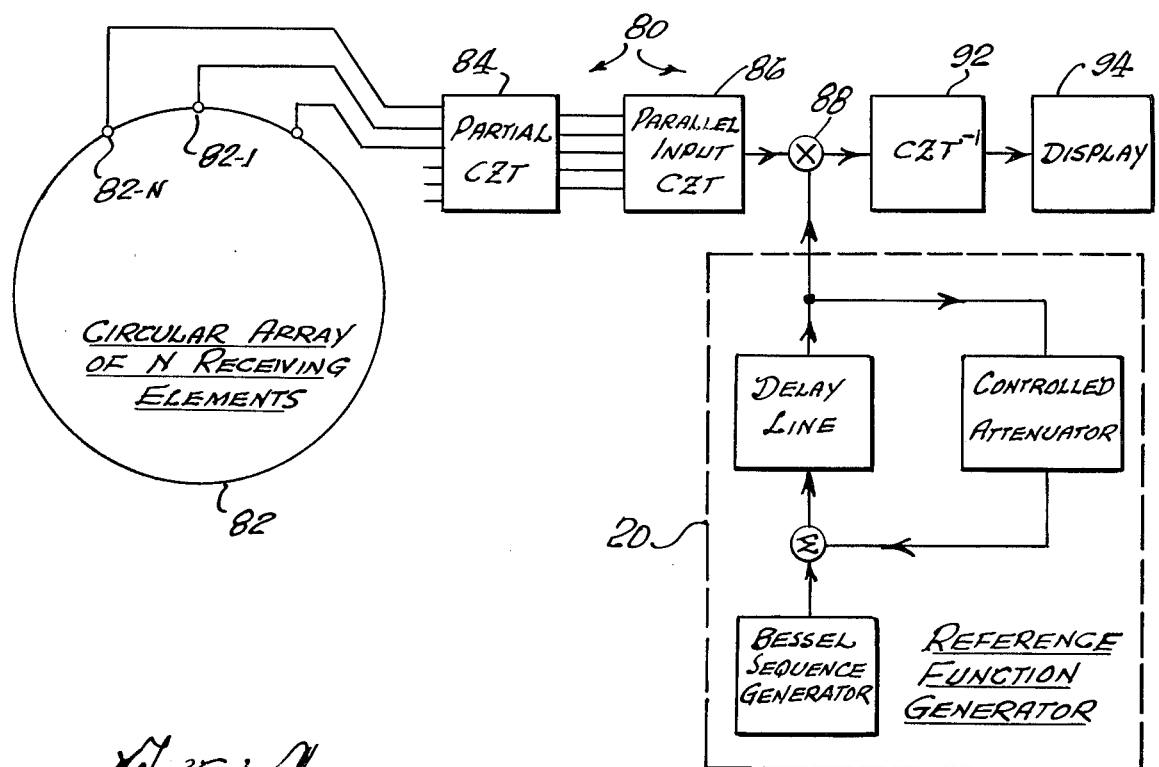
FIG. 4. BESSEL SEQUENCE BEAMFORMER USING A TWO-DIMENSIONAL CZT DEVICE.

TWO-DIMENSIONAL DFT DEVICE SIMILAR TO MODULAR CZT APPARATUS.

APPARATUS FOR OBTAINING THE DISCRETE FOURIER TRANSFORM DFT VIA THE CHIRP-Z TRANSFORM (CZT) ALGORITHM, WITH PARALLEL IMPLEMENTATION OF COMPLEX ARITHMETIC.

PARALLEL-INPUT, SERIAL-OUTPUT, CZT DEVICE USING MULTI-PORT TRANSVERSAL FILTER.

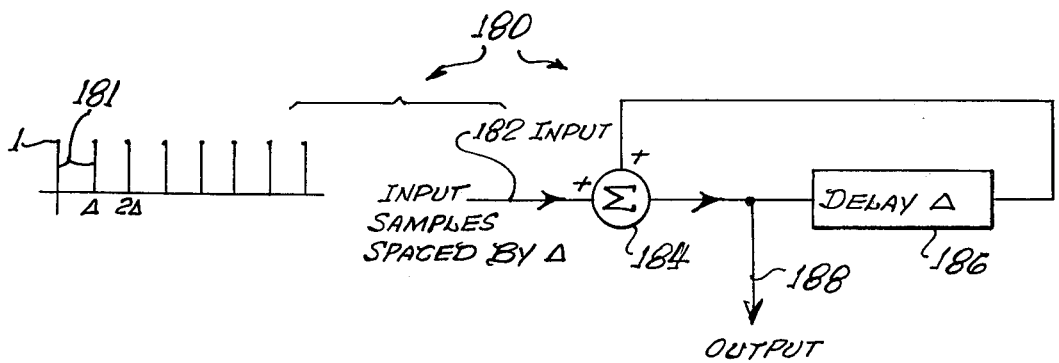

Note:
If input signal is $h_0, h_1, h_2$, with time spacing of $\Delta$ between samples, output is $h_0, h_0+h_1, h_0+h_1+h_2$, etc.

with spacing of $\Delta$ between samples.

FIG. 8. PRIOR ART
Simple Recursive Summer

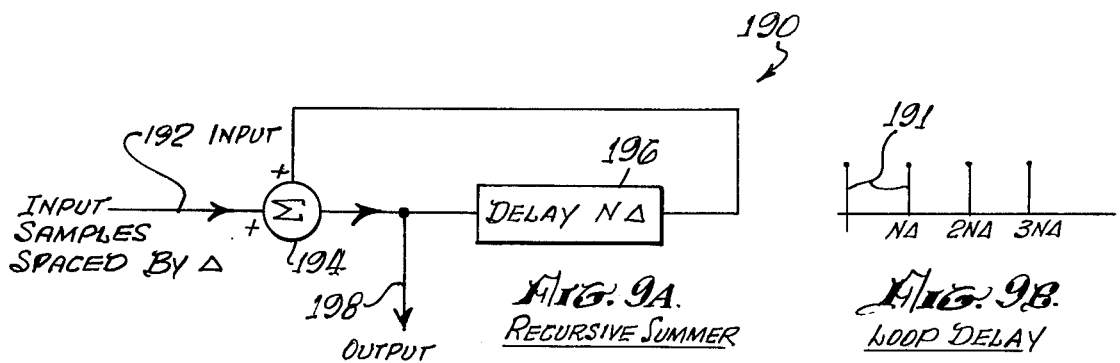

FIG. 9A. Recursive Summer

FIG. 9B. Loop Delay

Note:
If input is $h_0, h_1, \ldots$, spaced by $\Delta$,
output is $h_0, h_1, \ldots, h_{N-1}$,
$h_N+h_0, h_{N+1}+h_1, \ldots, h_{2N-1}+h_{N-1}$,
$h_{2N}+h_N+h_0, h_{2N+1}+h_{N+1}+h_1, h_{3N-1}+h_{2N-1}+h_{N-1}$, etc.

FIG. 9. (PRIOR ART)
Recursive Summer with Increased Loop Delay.

Note: $0 < \alpha < 1$
Typically, $0.9 < \alpha < 0.999$

STABLE RECURSIVE SUMMER.

Note:
If input is $h_0, h_1, h_2, \ldots$ spaced by $\Delta$, output is
$h_0, \alpha h_0 + h_1, \alpha^2 h_0 + \alpha h_1 + h_2, \ldots$

IMPULSE RESPONSE OF THE RECURSIVE SUMMER SHOWN IN FIG. 10.

BEAM FORMER USING BESSEL SEQUENCES

STATEMENT OF GOVERNMENT INTEREST

The invention described herein may be manufactured and used by or for the Government of the United States of America for governmental purposes without the payment of any royalties thereon or therefor.

FIELD OF THE INVENTION

This invention relates to a lightweight, compact, high-speed, relatively inexpensive beamformer for circular arrays.

DESCRIPTION OF THE PRIOR ART

Beamformers generally fall into three categories: phased arrays, delay and sum, and those using the discrete Fourier transform. Systems using phase shifters work only over relatively limited bandwidths — a small fraction of the design center frequency. Those using delay and sum require, effectively, one delay line per array element, and hence become large, complicated, and expensive when the number of elements in the array is large.

Transform processors using the digital computer to perform the discrete Fourier transform are limited in speed because they use only a small number of multipliers, perhaps only one. If they are used in space-time Fourier transform beamformers, this limits the allowable number of beams, elements, and frequency cells. More recent serial-access Fourier transform devices utilize a large number of taps in a transversal filter to perform many multiplications in parallel. Such serial-access Fourier transform devices provide a relatively direct implementation of space-time Fourier transform beam-forming for uniformly spaced line or planar arrays, but the corresponding operation for a circular array is not a simple two-dimensional Fourier transform.

SUMMARY OF THE INVENTION

The invention relates to a beam former, to be used with a circular array of N receiving elements, $N \geq 3$, comprising an array of N discrete Fourier transform (DFT) devices, each one connected to one of the receiving elements, for taking a temporal discrete Fourier transform of the signals at each of the N receiving elements.

Means are connected to the array of DFT devices, for connecting sequentially to each of the N devices.

A reference function generator generates the sequence of terms $$G_n = \sum_{p=-M}^{M} J_{n+pN}(x), \quad n = 0, 1, \ldots, N-1 \quad (1)$$

where the argument $x$ is equal to the number of wavelengths in the circumference of the circular array at the frequency being processed, and MN is greater than $x$, generally $$x \leq MN \leq 10x. \quad (2)$$

Means are connected to the connecting means and to the reference function generator, for circularly convolving the signals, for example acoustic signals, received from the connecting means and the function generator.

The beam former generally further comprises means connected to the convolving means, for displaying the inverse discrete Fourier transform, and therefore the beam pattern, of frequency versus azimuth distribution of the incoming signal field.

In another embodiment, the beam former, to be used with a circular array of N signal receiving elements, $N \geq 3$, may comprise a partial chirp-Z transform (CZT) device, having N inputs, connected to the N receiving elements, and N outputs, for taking the chirp-Z transform in one of the dimensions, temporal or spatial, of signals at the receiving elements. A parallel-input CZT device, having N inputs, is connected to the N outputs of the partial CZT device, for taking the chirp-Z transform of the signals in the other dimension, spatial or temporal.

The term "temporal" relates to a time transform of the output of one of the elements of the array. The term "spatial" relates to a transform where the index designates the element position among the elements of the array.

A reference function generator, identical to the one used with the first described embodiment, also forms a part of this second embodiment.

Means are connected to the outputs of the parallel-input CZT device and of the reference function generator, for summing the signals received from the CZT device and the function generator.

Means, whose input is connected to the output of the summing means, performs an inverse discrete Fourier transform on its input signal.

STATEMENT OF THE OBJECTS OF THE INVENTION

The object of the invention is to provide a beam former which is more economical, smaller in size, and lighter in weight than similar prior art beam formers.

The object of the invention will become more readily apparent from the ensuing specification when taken together with the drawings.

BRIEF DESCRIPTION OF THE DRAWINGS

FIG. 3 is a block diagram of a prior art Bessel function generator, an important component of the subject invention.

FIG. 4 is a block diagram of another embodiment of a Bessel sequence beam former of this invention, using a two-dimensional chirp-Z transform device.

FIG. 8 is a block diagram of a prior art simple recursive summer.

FIG. 9 is a block diagram of a prior art recursive summer, similar to the one shown in FIG. 8 except that it includes a delay line with increased loop delay.

DESCRIPTION OF THE PREFERRED EMBODIMENTS

Figure 1:
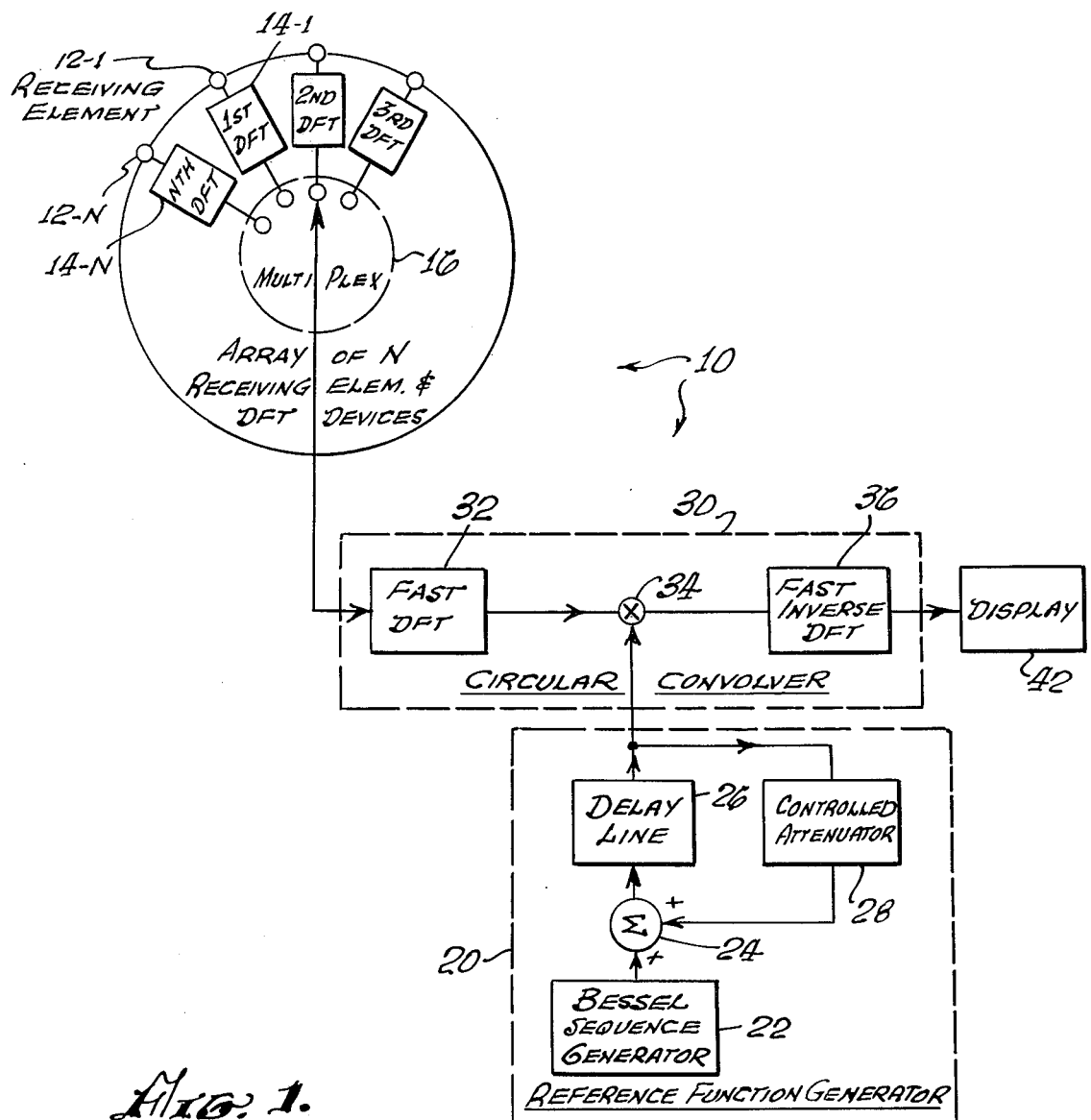
FIG. 1 is a block diagram of one embodiment of the Bessel sequence beam former of this invention.

Referring now to FIG. 1, therein is shown a beam former 10, to be used with a circular array of N receiving elements, 12-1 through 12-N, $N \geq 3$. The beam former 10 may comprise an array of N discrete Fourier transform (DFT) devices, 14-1 through 14-N, each one connected to one of the receiving elements, 12-1 through 12-N, for taking a temporal discrete Fourier transform of the signals at each of the N receiving elements. The receiving elements, 12-1 through 12-N, may be elements for receiving acoustic signals, for example.

Means 16, for example, an electronic multiplexer, are connected to the array of DFT devices, 14-1 through 14-N, for connecting sequentially to each of the N DFT devices.

In a generalized embodiment, a reference function generator 20 generates the sequence of terms $$G_n = \sum_{p=-M}^{M} J_{n+pN}(x), \quad n = 0, 1, \ldots, N - 1. \quad (1)$$

where the argument $x$ is equal to the number of wavelengths in the circumference of the circular and array at the frequency being processed, and M is chosen so that $J_n(x)$ is small for all $n \geq Mn$ Typically one would choose $$M \geq 2x/N. \quad (3)$$

The value of M is discussed hereinbelow.

Typical frequencies for acoustic applications would be between 10 Hz and 100 KHz. The equation for $G_n$, and its relationship to various signals in the system, is developed hereinbelow in great detail as Eq. (30).

Means 30 are connected to the connecting means 16 and to the reference function generator 20, for circularly convolving the signals received from the connecting means and from the function generator.

The beam former 10 shown in FIG. 1 may further comprise a means 42 connected to the convolving means, 30 for displaying the inverse discrete Fourier transform, and therefore the frequency versus azimuth distribution of the received acoustic signals.

Both a temporal and a spatial transform are taken. A spatial circular convolution is performed, by circular convolver 30, including spatial DFT 14 and 32, a frequency domain multiplication, and then an inverse spatial transform by fast inverse DFT circuit 36. This is all in the temporal frequency domain. Therefore, the final display 42 shows a pattern of frequency versus azimuth distribution of the incoming signal field.

In the beam former 10 shown in FIG. 1, the reference function generator 20 may comprise a means 22 for generating the Bessel sequence $$J_n(x), n = +MN, MN-1, \ldots, 1, 0, -1, \ldots, -MN \quad (4)$$

where the argument $x$ is equal to the number of acoustic wavelengths in the circumference of the array at the frequency being processed. The means 22 of FIG. 1 comprises the function generator 50 of FIG. 3.

The Bessel sequence generator 50, which is shown in detail in FIG. 3, is similar to the generator 10 shown in FIG. 1 of U.S. Pat. No. 3,809,876, dated May 7, 1974, to George W. Byram, which is entitled APPARATUS FOR THE GENERATION OF BESSEL FUNCTION SIGNALS.

As may be seen from FIG. 3, the Bessel sequence generator 50 accomplishes its recursion downward. That if, if the initial values are $J_{\nu+1}$ and $J_\nu$, the next term generated is $J_{\nu-1}$.

In Eq. (4) the required value of MN has been indicated, for the desired number of terms in the sum. In practice, the Bessel sequence recursion should start at a somewhat larger value than MN. Then the values become smaller and smaller, and when they reach the value of MN, use is made of the generator 50 for the recursive output, for approximately the next (2MN+1) time samples.

The exact starting and stopping times are not critical because the Bessel sequences become quite small, as the order gets larger, so that extra end-effect terms are negligible.

For simplicity of explanation, and to make the explanation more general, the general input terms $h_o, h_1, \ldots, h_{N-1}$, have been used. For the specific implementations shown, terms such as $J_{MN}, J_{MN-1}, \ldots, J_0, \ldots, J_{-MN}$, really apply. In fact, for reasons given hereinbelow the first term would have a subscript greater than MN, 3 MN being a reasonable value.

Referring back to FIG. 1, the reference function generator 20 further comprises a signal summer 24, one of whose inputs is the output of the Bessel sequence generator 22.

A delay line 26 has its input connected to the output of the summer 24, the gain of the delay line being slightly less than unity.

An attenuator 28 has its input connected to the output of the delay line 26, its output being connected to the signal summer 24, the attenuation being a function of the argument $x$.

Discussing the operation of the circuits of reference function generator 20 in more detail, assume a sequence of terms, which, for generality, may be labeled $h_0, h_1, \ldots, h_{N-1}$. The signals designated by the terms may be made to enter a summer 24, from generator 22. The output of the summer 24 feeds into the delay line 26 and then back into summer 24 together with the input signal. The amount of delay in the delay line 26 is so chosen that the delay between the successive samples coming in is predetermined. On the first pass of the signal, if the delay line 26 is empty to start with, the term $h_0$ comes out of generator 22 and out of delay line 26. Upon completing the path through the delay line 26 and the controlled attenuator 28, the term $h_0$ is added to the new term $h_1$, so that through the delay line 26 and attenuator 28, the signal $h_0 + h_1$ appears.

The attenuator 28 is included in the delay line loop to make the system more stable, by making the loop gain slightly less than one. Otherwise, numerical errors would built up, and the system could get out of control. This is the primary function of the attenuator 28.

The functioning of the delay line and attenuator are discussed hereinbelow in great detail in connection with the embodiment 200 shown in FIG. 10.

The system 10 of this invention is slightly different from that of the prior art in that, instead of summing all the terms of the sequence, only a comparatively small number of terms are summed. If N=3, to pick an arbitrary number, then the numbers which would be summed together are $J_6, J_3, J_0, J_{-3}, J_{-6}$. Another group is $J_5, J_2, J_{-1}, J_{-4}$ and still another, $J_4, J_1, J_{-2}, J_{-5}$. These are the only groups of terms for N=3. The delay must be made equal to the spacing between the terms that it is desired to sum.

In the beam former 10 shown in FIG. 1, the means for circularly convolving 30 may comprise means 32 connected to the connecting means 16, for taking the fast discrete Fourier transform of the N transformed signals.

The reason that the discrete Fourier transform is taken twice, in successive steps, first in circuits 14-1 through 14-N and then in circuit 32, is as follows. The first DFT circuits, 14-1 through 14-N, are temporal DFT devices. The temporal DFT's are commutated by means of switching means 16, generally an electronic multiplexing switch.

Assume the system 10 is so arranged that the d-c transform terms come out first. Then, as the switching means 16 rotates, the d-c DFT terms are obtained for all the N elements, 12-L through 12-N, of the array.

Now, another transform is taken of all the elements 12-L through 12-N of the array, by fast DFT device 32. This is a spatial transform implemented as a time-domain transform through the multiplexing switching means 16.

The effect is the same as if there is a two-dimensional data field, the coordinates being space and time, everything up to multiplier 34, described hereinbelow, is equivalent to doing a two-dimensional Fourier transform. DFT devices 14-L through 14-N, perform a temporal DFT, while device 32 performs a spatial DFT. The two-dimensional aspect is clearly shown in the embodiment 80 shown in FIG. 4.

The term FAST DFT in circuit block 32 not necessarily designate a fast Fourier transform (FFT), which has a specific connotation, but rather refers to a "high-speed" device, since it has to operate faster than the first DFT device, 14-L through 14-N. While it is not necessarily an FFT device, it could be a chirp-Z transform device, such as that shown in FIG. 2.

Figure 2:
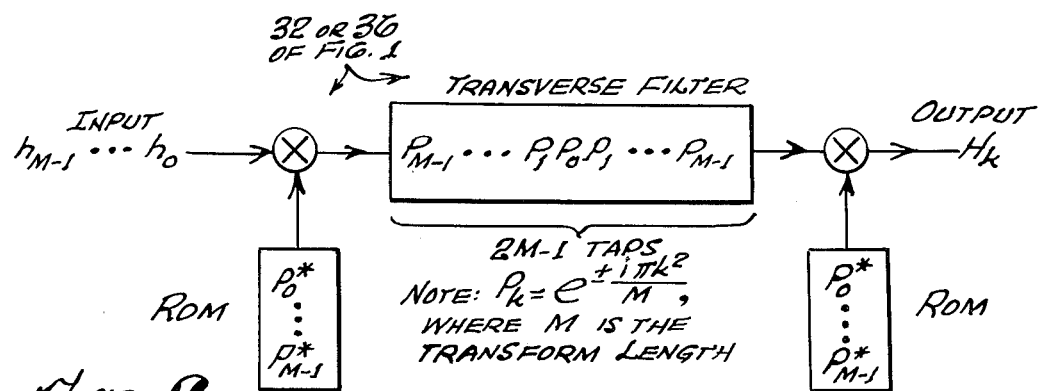
FIG. 2 is a block diagram of a prior art discrete Fourier transform (DFT) device using the chirp-z transform.

The embodiment shown in FIG. 2 is described in a generalized form in U.S. Pat. No. 3,900,721, entitled SERIAL-ACCESS LINEAR TRANSFORM, to Speiser et al, which issued on August 19, 1975. It exemplifies blocks 32 and 36 of circular convolver 30.

A multiplier 34 whose two inputs comprise the outputs of the delay line 26 of the reference function generator 20 and of the DFT means 32 multiplies the signals at its two inputs.

Means 36 whose input is connected to the output of the multiplier 34 are provided for taking the inverse discrete Fourier transform of the signal received at its input.

The specific structure of the fast inverse DFT circuit 36 is not shown in detail inasmuch as these circuits are described in the prior art. A general description is outlined herein of the two common methods in which the inverse transform is performed.

To perform the direct discrete Fourier transform is to take the data $g_n$, and perform the summation $$\sum_{n=0}^{N-1} g_n e^{-\frac{i2\pi nk}{N}}.$$

To perform the inverse transform, the summation $$\sum_{n=0}^{N-1} g_n e^{\frac{i2\pi nk}{N}}$$

is made, the sign of the exponential power being different. Fast Fourier transform (FFT) hardware may be used, and the signs of the imaginary coefficients, changed from negative to positive, as one way of accomplishing the inverse discrete Fourier transform.

In the second common method, if a chirp-Z transform be performed, again all that need be done is to change the sign of the exponent in the premultiplier function, the sign of the exponent in the tap weight of the filter, and the sign of the exponent in the post-multiplier function.

Yet another method of obtaining the inverse discrete Fourier transform is to leave the discrete Fourier transform alone, and to put the input function, say $G_n$, into the form of $$G_n = G_{n\,real} + iG_{n\,imag} \tag{5}$$

The input $G_n$ may then be conjugated, a forward transform is taken, and the output is conjugated also. This changes the sign of the imaginary part in the input channel and permits using regular, forward, discrete Fourier transform hardware, totally unchanged, and then changing the sign of the imaginary terms in the output channel. These are trivial operations, well known in the prior art.

As is shown in FIG. 1, the display means 42 is connected to the inverse DFT means 36, for displaying the inverse discrete Fourier transform, and therefore the beam pattern, in the form of the frequency versus azimuth distribution of the received acoustic signals.

With respect to alternative embodiments, the individual element discrete Fourier transform devices, 14-L through 14-N, of FIG. 1, corresponding to the partial CZT device 84 of FIG. 3, could be implemented as chirp-Z transforms using charge-coupled device (CCD) transversal filters, or via the Fast Fourier transform algorithm using a conventional digital computer. The latter method would be possible only if the number of elements, beams, and frequencies was sufficiently small, and would require analog-to-digital conversions. The fast DFT device 32 and the fast inverse DFT device 36 could be implemented as chirp-Z transforms using acoustic surface wave transversal filters or cross-correlators. Alternatively, digital correlators may be used to perform the required convolution in the partial CZT device 84 of FIG. 4.

Referring now to FIG. 4, therein is shown a beam former 80, again to be used with a circular array of N signal receiving elements 82-L through 82-N, generally acoustic receiving elements, $N \geq 3$, comprising a partial chirp-Z transform (CZT) device 84, having N inputs connected to the N receiving elements, and N outputs. Its function is to take the temporal chirp-Z transforms of signals received from the receiving elements, 82-L through 82-N.

A parallel-input CZT device 86, having N inputs connected to the N outputs of the partial CZT device 84, takes the spatial chirp-Z transform of the signals.

A reference function generator 20, identical the the one described hereinabove, again generates the sequence of terms $$G_n = \sum_{p=-M}^{M} J_{n+pN}(x), n = 0, 1, \ldots, N - 1. \quad (1)$$

Means 88 are connected to the parallel-input CZT device 86 and to the reference function generator 20 for summing the signals received from the CZT device and the function generator.

Means 92, whose input is connected to the output of the summing means 88, perform an inverse discrete Fourier transform on its input signal.

The beam former 80 may further comprise means 94, connected to the inverse (DFT) means 92, for displaying the inverse discrete Fourier transform, and therefore the beam pattern. The pattern displayed by display 94 is similar to that of display 42 of FIG. 1.

An inverse Fourier transform may also be performed in the time domain, but this type of display might not be as useful.

Equations involved with circular array beam-forming are discussed hereinbelow.

Figure 5:
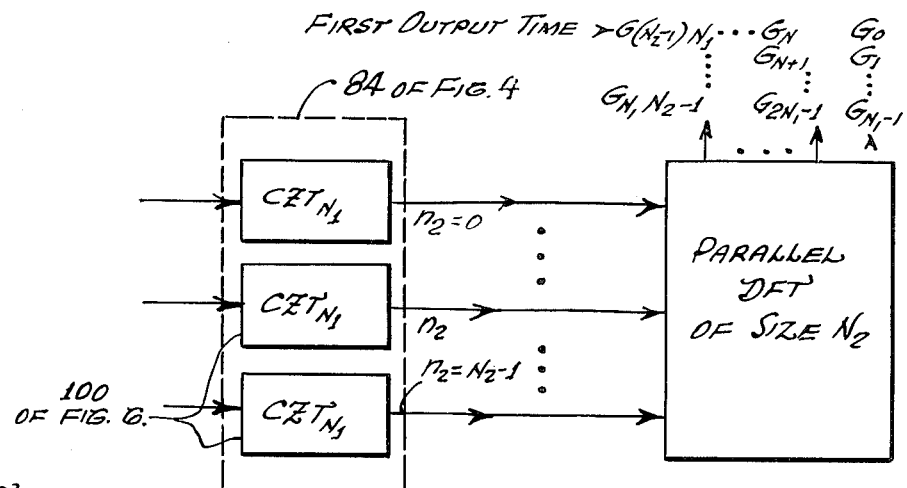
FIG. 5 is a block diagram of a two-dimensional Fourier transform apparatus, using a parallel-input, parallel-output, discrete Fourier transform device, described in connection with a prior art modular chirp-Z apparatus.

The operation of the apparatus shown in FIG. 5 is described in great detail in U.S. Pat. No. 3,965,343, entitled MODULAR SYSTEM FOR PERFORMING THE DISCRETE FOURIER TRANSFORM VIA THE CHIRP-Z TRANSFORM, to Speiser et al, which issued on June 22, 1976.

Figure 6:
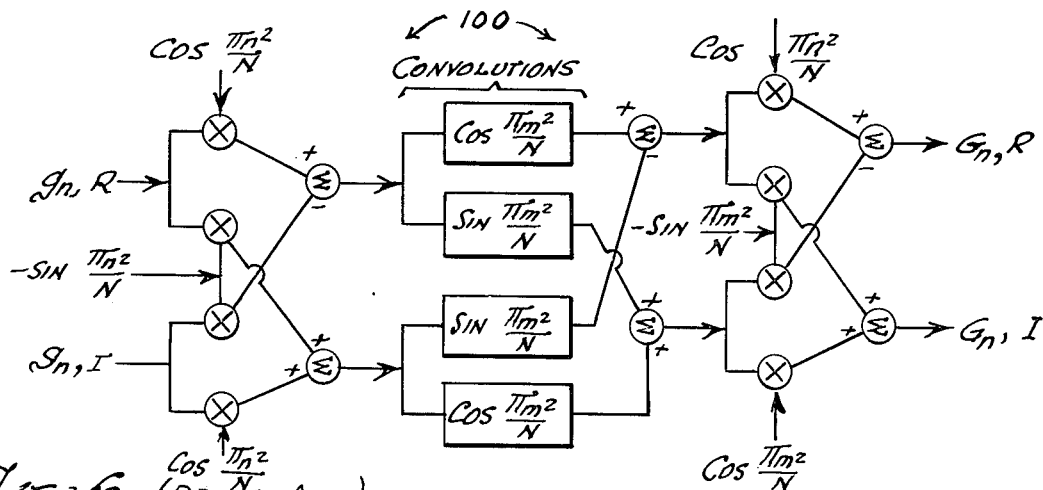
FIG. 6 is a block diagram of prior art apparatus for obtaining the discrete Fourier transform via the chirp-Z transform algorithm, with parallel implementation of the complex arithmetic.

The apparatus 100 shown in FIG. 6 is described in great detail in U.S. Pat. No. 3,900,721, described hereinabove.

Figure 7:
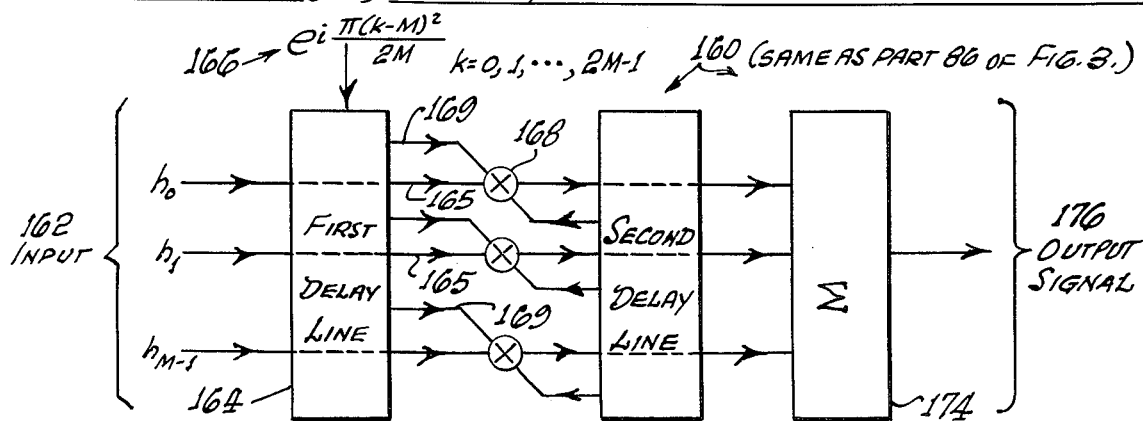
FIG. 7 is a block diagram of a prior art parallel-input, serial-output, chirp-Z transform device using a multiport transversal filter.

The CZT device 160 shown in FIG. 7 is described in great detail in U.S. Pat. No. 3,965,343, described hereinabove. FIGS. 8-11 are included to show in great detail the operation of the reference function generator 20 of FIG. 1.

FIG. 8 shows a simple, recursive, prior art, summer 180. An input signal, at input 182, comprising signal samples 181 spaced by a time interval $\Delta$, enters means for summing 184, then goes out to the delay line 186. It will be noted that the input to delay line 186 also forms an output 188 of summer 180. Out of delay line 186, the signal enters the second input of the means for summing 184.

FIG. 9, comprising FIGS. 9A and 9B, shows a recursive summer 190, similar to summer 180, shown in FIG. 8, except that it comprises a filter 196, shown in FIG. 9A, which delays signals going through it by a time $N\Delta$, shown in FIG. 9B, instead of the time $\Delta$ of FIG. 8. However, the input signal samples, $h_0, h_1, h_2, \ldots, h_{N-1}$, are still spaced by a time interval $\Delta$.

During the first N output times, that is, during a time span of $N\Delta$, the first N input pulses only, $h_0, h_1, \ldots$, appear at the output 198.

The delay line 196 is $N\Delta$ long. Summing terms having subscripts rumming from MN to $-MN$, spaced apart by N, involves 2M terms plus one term for the zero subscript, that is, $(2M+1)$ terms. To get to the point where $(2M+1)$ terms are summed, there must be $(2M+1)$ passes through the delay line. But this means that approximately 2MN terms must go through the delay line before the first useful term in the sum comes out. Therefore, the Bessel generator must start at approximately $h_{3MN}$, or $J_{3MN}$, and work downwards to lower subscripts. After 2 MN time units, where $\Delta$ is a time unit, the first useful term in the output is obtained. N successive useful sums are then provided.

From the time the Bessel generator is started $(2M+1)$ passes are required. This is not a great number, since MN was only required to be somewhat larger than the number of wavelengths in the diameter of the array. Practical arrays may vary anywhere from one wavelength to twenty or thirty wavelengths. Since a start-up time is required, only approximately twenty time samples are required.

At time $N\Delta$, the first input pulse $h_0$ has gone through the delay line 196, where it had been delayed by $N\Delta$ time units, and now appears at the output 198 at the same time as pulse $h_N$ appears. One time unit $\Delta$ later the pulses $h_{N+1} + h_1$ appear. Assuming a total of 2N samples, the last term is $h_{2N-1} + h_{N-1}$, all terms being the sum of two terms spaced by a time $\Delta N$.

The above description explains what happens during the first N, and second N time samples. Assuming 3N time samples, after each time $\Delta$, at the output 198 there is a signal which comprises three components, two of them being identical to the components when only two components were present, the third component having a subscript greater by N than the highest subscript of the pair. For example, one pair of signal components is $(h_{N+1} + h_1)$, while the corresponding signal having three components comprise $h_{2N+1} + (h_{N+1} + h_1)$.

After K passes through the delay line 196, that is, after $KN\Delta$ time periods, the output signal, at output 198, comprises K groups of terms, each group spaced from an adjacent group, by an amount N. This is exactly the kind of sum which Eq. (1), discussed hereinabove, and Eq. (30), discussed hereinbelow, define. Eqs. (1) and (30) are identical. This is the type of sum that the recursive summer 190, shown in FIG. 9, can accomplish, providing that signals have been propagating through delay line 196 long enough so that the required number of terms have been built up. That is an ideal realization.

The operation performed by the recursive filter 190 may be considered to be a cross-convolution of the input sequence, entering at input 192, with a set of uniformly weighted delta functions spaced apart by a time $N\Delta$.

If the delay line 196 were digital, a digital to analog conversion would be required, to produce a useful output. An all-digital system, using digital filtering, could be used.

Instead of delay line 196, an analog or digital shift register may be used. If an analog system is used, an analog shift register would be used. In FIG. 1, the implementation of primary interest makes use of chirp-Z transforms for the discrete Fourier transforms, which are analog transforms.

In this invention, the implementation of primary interest is analog, but when it is analog, the delay line 196 is imperfect. In particular, there will be some attenuation through the delay line 196. To compensate for the attenuation, an amplifier is required. This amplifier 208 is shown in the feedback loop of the stable recursive filter 200 shown in FIG. 10. The gain of amplifier 208 must be just great enough so that the overall loop gain $\alpha$ is less than one. More specifically, the product of the gain of the amplifier 208 and the attenuation and losses in delay line 206 must be slightly less than one, in order that the summer 200 be stable.

Figure 10:
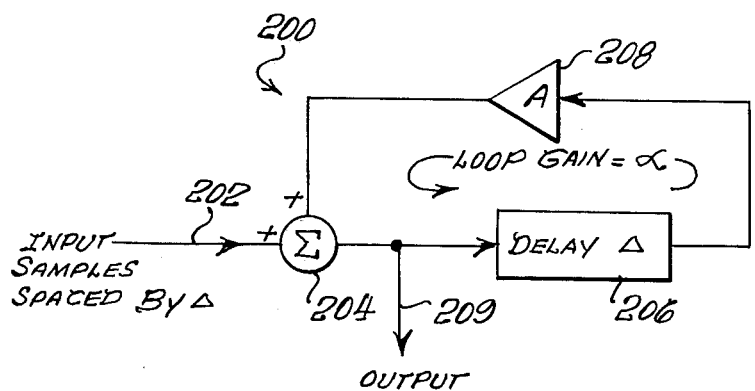
FIG. 10 is a block diagram of a prior art stable recursive summer.

If the loop gain α be held close to one, then the action of the circuit 200 of FIG. 10 will be similar to that of the embodiment 190 shown in FIG. 9A.

Figure 11:
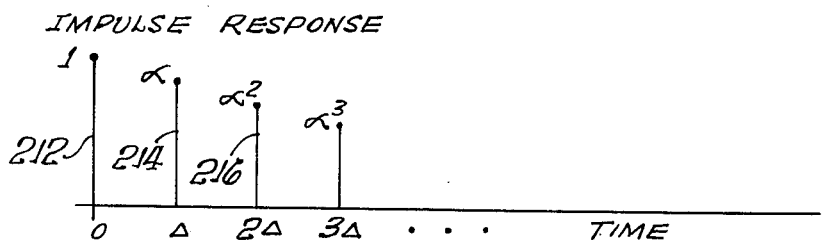
FIG. 11 is a chart showing the impulse response of the recursive summer shown in FIG. 10.

FIGS. 10 and 11 show what happens at the output 209 of the device when a single pulse is applied at the input 202 of the summer 200. At this point in time, there is no other signal in the summer 200, and therefore pulse 212, having a normalized amplitude of 1 in FIG. 11, will appear at the output 209. If the input signal at input 202 is a series of pulse samples $h_0, h_1, h_2, \ldots, h_{N-1}$, the first output signal at output 209 will be $h_0$.

At a time Δ later, the sample $h_0$ will have traversed the feedback loop, which includes amplifier 208, and appears at the output 209 as a pulse having an amplitude $\alpha h_0$. This reduction in amplitude by a factor of α is shown by pulse 214 in FIG. 11.

Therefore, as is shown in FIG. 11, the impulse response of summer 202 is a train of impulses spaced Δ time units apart. This type of function makes the summer 200 similar to a discrete time integrator.

$$P(\theta) = \int_0^{2\pi} p(z) e^{\frac{i2\pi R_0}{\lambda} \cos(z-\theta)} dz \quad (6)$$

Let $$p(z) = a(z) w(z), \quad (7)$$

where $a(z)$ represents the incident field and $w(z)$ is the desired array shading or weighting. For a discrete array, $$w(z) = \sum_{n=0}^{N-1} w_n (z - \frac{2\pi n}{N}) \quad (8)$$

$$P(\theta) = \sum_{n=0}^{N-1} w_n a(\frac{2\pi n}{N}) e^{i2\pi R_0 \cos((2\pi n/N)-\theta)} \quad (9)$$

Let $a_n = a(2\pi n/N)$, $P_s = P(2\pi s/N)$, $k = 2\pi R_0/\lambda$, (10)

where λ is the acoustic wavelength.

$$P_s = \sum_{n=0}^{N-1} w_n a_n e^{ik \cos((2\pi/N)(n-s))} \quad (11)$$

It will be noted that Eq. (11) represents a discrete circular convolution of $w_n a_n$ with $$c_s = e^{ik \cos(2\pi s/N)} \quad (12)$$

The circular convolution coefficients are functions of both the elements index, s, and the parameter k, which depend upon the wavelength and hence the temporal frequency. If a sufficiently large read-only memory is available, they may of course be precomputed once and for all and be provided from the read-only memory together with a digital-to-analog converter. As an alternative to the large read-only memory, the direct generation of the circular convolution coefficients will be described by means of expressing these coefficients in terms of Bessel functions.

First, it will be noted that $$c_{s+N/4} = e^{ik \cos(2\pi s/N + \pi/2)} \quad (13)$$

But $\cos(U + \pi/2) = -\sin(U)$. (14)

Let $g_s = e^{ik \sin(2\pi s/N)}$ (15)

$$G_n = \sum_{s=0}^{N-1} g_s e^{i2\pi sn/N} \quad (16)$$

$$G_n = \sum_{s=0}^{N-1} e^{-i(\frac{2\pi na}{N} - k \sin 2\pi s/N)} \quad (17)$$

The above equation is the discrete equivalent of the Bessel integral:

$$J_n(z) = (\frac{1}{2\pi}) \int_0^{2\pi} e^{i(n\theta - z \sin \theta)} d\theta \quad (18)$$

$$J_n(z) = \int_0^1 e^{i(2\pi nu - z \sin 2\pi u)} du \quad (19)$$

$$J_n(z) = \int_0^1 e^{-i(2\pi nu - z \sin 2\pi u)} du \quad (20)$$

By representing the discrete sum in Eq. (17) as the convolution of a continuous kernel with a sequence of delta functions, $G_n$ can be expressed in terms of Bessel functions:

$$G_n = \sum_{s=0}^{N-1} e^{-i((2\pi ns/N) - k \sin(2\pi s/N))} \quad (21)$$

$$G_n = \sum_{s=0}^{N-1} \int_0^1 \delta(u - (s/N)) e^{-i(2\pi nu - k \sin 2\pi u)} du \quad (22)$$

$$G_n = \int_0^1 (\sum_{s=0}^{N-1} \delta(u - (s/N))) (e^{-ik \sin 2\pi u}) e^{-i2\pi nu} du \quad (23)$$

Equation (23) represents the Fourier coefficient of a product. By the convolution theorem, this is just the convolution of the Fourier coefficients.

The nth Fourier coefficient of $e^{-ik \sin 2\pi u}$ is $J_n(k)$, from Eq. (20). The nth Fourier coefficient of $$\sum_{s=0}^{N-1} \delta(u - (s/N))$$

is zero when n is not a multiple of N, and is equal to N whenever n is a multiple of N. Therefore $$G_n = N \sum_{p=-\infty}^{\infty} J_{n+pN}(k) \quad (24)$$

Since the amplitude scaling is unimportant, and the Bessel coefficients are negligible when the order is larger than about 3 times the argument, the approximate DFT of the circular convolution coefficients given by $$G_n = \sum_{p=-M}^{M} J_{n+pN}(k) \quad (25)$$

can be used.

With respect to the value of the parameter M, in Eq. (30), and various other equations, basically, it is desired to make the term M large enough so that the sum of terms larger than M in the summation may be neglected. This occurs when the Bessel sequence takes on a small value. The Bessel sequence gets small when the order, designated by the subscript, $n + pN$ in this case, is much larger than the argument $x$.

Reference to TABLE 1 indicates when this condition exists. This table is taken from "Tables of Higher Functions", by Jahnke, Emde, Losch, sixth edition, 1960, published by the McGraw-Hill Book Company, Inc., New York, N.Y. In the table shown herein, $v$ in the Jahnke table is replaced by $(n + pN)$, and $n$ is replaced by $x$. In this invention, only integral values of $(n+pN)$ are of interest. An arbitrarily small value of $J_{n+pN}(x)$ was assumed to be less than $0.5 \times 10^{-3}$. The sum of terms each of which are progressively less than this value can be neglected.

Results from TABLE 1 are condensed in TABLE 2. For $x = 1$, the largest index which must be considered is 4; for $x = 2$, it is 6, etc. Inasmuch as the array of this invention would generally not be greater than 20 wave lengths in circumference, TABLE 2 is restricted to values of $x \leq 20$. Terms in the sum with index, in the worst case, greater than 28 may be ignored.

Table 1.

| | BESSEL FUNCTIONS $J_{n+pN}(x)$ | | | | | |
|---|---|---|---|---|---|---|
| n+Pn | $J_{n+pN}(1)$ | $N_{n+pN}(2)$ | $J_{n+pN}(3)$ | $J_{n+pN}(4)$ | $J_{n+pN}(5)$ | $J_{n+pN}(6)$ |
| 0 | +0.7652 | +0.2239 | −0.2601 | −0.3971 | −0.1776 | +0.1506 |
| 0.5 | +0.6714 | +0.5130 | +0.6501(−1) | −0.3019 | −0.3422 | −0.9102(−1) |
| 1.0 | +0.4401 | +0.5767 | +0.3391 | −0.6604(−1) | −0.3276 | −0.2767 |
| 1.5 | +0.2403 | +0.4913 | +0.4777 | +0.1853 | −0.1697 | −0.3279 |
| 2.0 | +0.1149 | +0.3528 | +0.4861 | +0.3641 | +0.4657(−1) | −0.2429 |
| 2.5 | +0.4950(−1) | +0.2239 | +0.4127 | +0.4409 | +0.2404 | −0.7295(−1) |
| 3.0 | +0.1956(−1) | +0.1289 | +0.3091 | +0.4302 | +0.3648 | +0.1148 |
| 3.5 | +0.7186(−2) | +0.6852(−1) | +0.2101 | +0.3658 | +0.4100 | +0.2671 |
| 4.0 | +0.2477(−2) | +0.3400(−1) | +0.1320 | +0.2811 | +0.3912 | +0.3576 |
| 4.5 | +0.8067(−3) | +0.1589(−1) | +0.7760(−1) | +0.1993 | +0.3337 | +0.3846 |
| 5.0 | | +0.7040(−2) | +0.4303(−1) | +0.1321 | +0.2611 | +0.3621 |
| 5.5 | | +0.2973(−2) | +0.2266(−1) | +0.2266(−1) | +0.1906 | +0.3098 |
| 6.0 | | +0.1202(−2) | +0.1139(−1) | +0.4909(−1) | +0.1310 | +0.2458 |
| 6.5 | | | +0.5493(−2) | +0.2787(−) | +0.8558(−1) | +0.1833 |
| 7.0 | | | +0.2547(−2) | +0.1518(−1) | +0.5338(−1) | +0.1296 |
| 8 | | | | +0.4029(−2) | +0.1841(−1) | +0.5653(−1) |
| 9 | | | | +0.9386(−3) | +0.5520(−2) | +0.2117(−1) |
| 10 | | | | | +0.1468(−2) | +0.6964(−2) |
| 11 | | | | | | +0.2048(−2) |
| 12 | | | | | | +0.5452(−2) |

TABLE 2

| X | Value of m such that $|J_k| < 0.5 \times 10^{-3}$ for $k \geq n$ |
|---|---|
| 1 | 4 |
| 2 | 6 |
| 3 | 7 |
| 4 | 9 |
| 5 | 10 |
| 6 | 12 |
| 7 | 13 |
| 8 | 14 |
| 9 | 15 |
| 10 | 17 |
| 11 | 18 |
| 12 | 19 |
| 13 | 20 |
| 14 | 21 |
| 15 | 22 |
| 16 | 24 |
| 17 | 25 |
| 18 | 26 |
| 19 | 27 |
| 20 | 28 |

The question now arises as to how large M must be. Values of up to NM must be considered. Whenever NM is greater than approximately 28, even in the worst case, it can be neglected. Therefore, M, in practical cases, would be a fairly small integer. It will always be in the range such that NM has a value between $x$ and $10x$. The exact value will depend upon the amount of error which can be tolerated in the approximation.

Obviously, many modifications and variations of the present invention are possible in the light of the above teachings, and, it is therefore understood that within the scope of the disclosed inventive concept, the invention may be practiced otherwise than specifically described.

What is claimed is:

1. A beam former, to be used with a circular array of N signal receiving elements, $N \geq 3$, comprising:

an array of N discrete Fourier transform (DFT) devices, each one connected to one of the receiving elements, for taking a temporal discrete Fourier transform of the signals at each of the N receiving elements;

means connected to the array of DFT devices, for connecting sequentially to each of the N devices;

a reference function generator, which generates the sequence of terms $$G_n = \sum_{p=-M}^{M} J_{n+pN}(x), \; n = 0, 1, \ldots, N-1,$$

where the argument $x$ is equal to the number of wavelengths in the circumference of the circular array at the frequency being processed; and means connected to the connecting means and to the reference function generator, for circularly convolving the signals received from the connecting means and the function generator.

2. The beam former according to claim 1, further comprising:

means connected to the convolving means, for displaying the inverse discrete Fourier transform, and therefore the beam pattern.

3. The beam former according to claim 1, wherein:

the receiving elements are elements for receiving acoustic signals.

4. The beam former according to claim 1, wherein the reference function generator comprises:

means for generating the Bessel sequence $J_n(x)$, $n = 0, 1, \ldots, N-1$, where the argument $x$ is equal to the number of acoustic wavelengths in the circumference of the array at the frequency being processed;

a signal summer, one of whose inputs is the output of the generating means;

a delay line, whose input is connected to the output of the summer; and an attenuator, whose input is connected to the output of the delay line and whose output is connected to the signal summer, the loop gain of the delay line and attenuator being slightly less than one.

5. The array according to claim 4, further comprising:
   means connected to the convolving means for displaying the beam pattern as a function of frequency versus azimuth.

6. The beam former according to claim 1, wherein the means for circularly convolving comprises:
   means connected to the connecting means, for taking the discrete Fourier transform of the N transformed signals;
   a multiplier, whose two inputs comprise the outputs of the reference function generator and of the DFT means, for multiplying the signals at its two inputs; and
   means whose input is connected to the output of the multiplier, for taking the inverse discrete Fourier transform of the signal received at its input.

7. The array according to claim 6, further comprising:
   means connected to the inverse DFT means for displaying the inverse discrete Fourier transform.

8. A beam former, to be used with a circular array of N signal receiving elements, $N \geq 3$, comprising:
   a partial chirp-Z transform (CZT) device, having N inputs connected to the N receiving elements, and N outputs, for taking the chirp-Z transform in one of the dimensions, temporal or spatial of signals at the receiving elements;
   a parallel-input CZT device, having N inputs connected to the N outputs of the partial CZT device, for taking the chirp-Z transform of the signals in the other dimension, spatial or temporal;
   a reference function generator, which generates the sequence of terms $$G_n = \sum_{p=-M}^{M} J_{n+pN}(x), n = 0, 1, \ldots, N-1,$$

where the argument $x$ is equal to the number of wavelengths in the circumference of the circular array at the frequency being processed; and
   means connected to the parallel-input CZT device and to the reference function generator, for summing the signals received from the CZT device and the function generator; and
   means, whose input is connected to the output of the summing means, for performing an inverse discrete Fourier transform on its input signal.

9. The beam former according to claim 8, further comprising:
   means connected to the inverse DFT means, for displaying the inverse discrete Fourier transform, and therefore the beam pattern.

10. The beam former according to claim 9, wherein:
   the receiving elements are elements for receiving acoustic signals.

11. The beam former according to claim 8, wherein the reference function generator comprises:
   means for generating the Bessel sequence $J_n(x)$, $n = 0, 1, \ldots, N-1$, where the argument $x$ is equal to the number of acoustic wavelengths in the circumference of the array at the frequency being processed;
   a signal summer, one of whose inputs is the output of the generating means;
   a delay line, whose input is connected to the output of the summer; and
   an attenuator, whose input is connected to the output of the delay line and whose output is connected to the signal summer;
   the gain of the loop which includes the delay line and attenuator being less than one.

12. The array according to claim 11, further comprising:
   means connected to the inverse DFT means for displaying the inverse discrete Fourier transform, and therefore the beam pattern formed by the array.

* * * * *